United States Patent
Littrell et al.

(10) Patent No.: US 8,698,648 B2
(45) Date of Patent: Apr. 15, 2014

(54) METHODS AND SYSTEMS OF SIMULTANEOUSLY COMMUNICATING UTILITY DATA AND VOICE DATA

(75) Inventors: Nathan Bowman Littrell, Gardnerville, NV (US); Kenneth James Caird, Symrna, GA (US); Lincoln Mamoru Fujita, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 1015 days.

(21) Appl. No.: 12/351,349

(22) Filed: Jan. 9, 2009

(65) Prior Publication Data

US 2010/0176966 A1 Jul. 15, 2010

(51) Int. Cl.
*G08B 23/00* (2006.01)

(52) U.S. Cl.
USPC .................................... 340/870.02

(58) Field of Classification Search
USPC ...................... 340/870.02; 709/219
See application file for complete search history.

(56) References Cited

U.S. PATENT DOCUMENTS

| | | | |
|---|---|---|---|
| 4,680,786 A | 7/1987 | Baker et al. | |
| 4,908,819 A * | 3/1990 | Casady et al. | 370/204 |
| 5,537,610 A | 7/1996 | Mauger et al. | |
| 5,719,564 A * | 2/1998 | Sears | 340/870.02 |
| 5,890,064 A | 3/1999 | Widergen et al. | |
| 5,995,843 A | 11/1999 | Sjodin et al. | |
| 6,624,532 B1 * | 9/2003 | Davidow et al. | 307/39 |
| 6,763,233 B2 | 7/2004 | Bharatia | |
| 6,970,719 B1 | 11/2005 | McConnell et al. | |
| 7,028,311 B2 | 4/2006 | Roach et al. | |
| 7,269,653 B2 | 9/2007 | Mentze et al. | |
| 7,366,127 B2 | 4/2008 | Einola et al. | |
| 2003/0033384 A1 * | 2/2003 | Nishizawa et al. | 709/219 |
| 2003/0233480 A1 * | 12/2003 | Peng et al. | 709/250 |
| 2005/0177619 A1 * | 8/2005 | Charas | 709/203 |
| 2005/0286686 A1 | 12/2005 | Krstulich | |
| 2007/0201494 A1 * | 8/2007 | Lou et al. | 370/401 |
| 2008/0109094 A1 * | 5/2008 | Nakamura et al. | 700/94 |
| 2008/0238701 A1 * | 10/2008 | Bickel et al. | 340/635 |

OTHER PUBLICATIONS

Munoz, Luis; "Voice and Data Services in Power Utilities Using Tetra System", 1996 IEEE 46th Vehicular Technology Conference, Atlanta, GA, USA, Apr. 28-May 2, 1996: Mobile Technology for the Human Race; IEEE, Apr. 1, 1997, ISBN 978-0-7803-3157-0, Washington, D.C., USA.

EPO Foreign Search Report dated Apr. 28, 2010 for Application No. 10150152.6-2414.

* cited by examiner

*Primary Examiner* — Rexford Barnie
*Assistant Examiner* — Joseph Inge
(74) *Attorney, Agent, or Firm* — Armstrong Teasdale LLP

(57) ABSTRACT

A method for communicating utility data includes receiving a voice signal and a data signal via a utility network, combining the voice signal and the data signal to form a communication signal, and transmitting the communication signal to a plurality of utility asset controllers and handheld devices via the utility network.

7 Claims, 2 Drawing Sheets

METHODS AND SYSTEMS OF SIMULTANEOUSLY COMMUNICATING UTILITY DATA AND VOICE DATA

BACKGROUND OF THE INVENTION

The embodiments described herein relate generally to the transmission of utility data via a utility network and, more particularly, methods and systems for transmitting utility data and digital voice signals using a single utility network.

At least some known communication systems provide wireless network access to data using a centralized configuration device. For example, in some known systems network access data and/or network security data is communicated wirelessly to a communications device via the configuration device. The communication device is then permitted to access a first portion of data stored on the network based on the network access data and a second portion of the data stored on the network based on network security data.

Moreover, at least some known communication systems provide users with automatic handoff operations while roaming between network terminals. For example, in some known systems a mobile terminal requests a support node of a legacy wireless network. The legacy wireless network authenticates the mobile terminal and, if the mobile terminal is authenticated, the requested support node facilitates communication between the mobile terminal and other devices on the legacy wireless network. At some point, the mobile terminal may request a support node on a different wireless network that uses a different network configuration. The mobile terminal is authenticated by the new wireless network and, if authenticated, communication by the mobile terminal is enabled across the new wireless network and the connection to the legacy wireless network is dropped. Other known systems enable a mobile terminal to automatically switch between, for example, a private wireless communication network to a public wireless communication network.

Furthermore, at least some known communication systems facilitate registering a mobile device, such as a cellular phone, with a network. For example, in some known systems a plurality of mobile devices may be distributed by a wireless network provider, wherein each mobile device includes provisioning data for use in activating the mobile device on the network. Each mobile device uses the provisioning data during, for example, power-up, to gain communication access and to enter into a provisioning data session with a provisioning server.

However, such known systems do not enable the combination of voice and data signals. Accordingly, systems and/or methods that provide a secure communication signal to a network are desirable, wherein the communication signal is generated by combining a voice signal and a data signal using a centralized controller.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a method for communicating utility data includes receiving a voice signal and a data signal via a utility network, combining the voice signal and the data signal to form a communication signal, and transmitting the communication signal to a plurality of utility asset controllers and handheld devices via the utility network.

In another aspect, a system for communicating utility data across a utility network includes a handheld device, a utility asset controller, and a data aggregator communicatively coupled to the handheld device and the utility asset controller via the utility network. The data aggregator is configured to receive a voice signal and a data signal from the handheld device and/or the utility asset controller, combine the voice signal and the data signal to form a utility communication signal, and transmit the utility communication signal across the utility network for reception by the handheld device and/or the utility asset controller.

In another aspect, a data aggregator is configured to communicate utility data over a utility network. The data aggregator includes a network interface configured to receive a voice signal and a data signal from the utility network, and a processor coupled to the network interface. The processor is programmed to combine the voice signal and the data signal to form a utility communication signal, and the network interface further is configured to transmit the communication signal to the utility network.

BRIEF DESCRIPTION OF THE DRAWINGS

The embodiments described herein may be better understood by referring to the following description in conjunction with the accompanying drawings.

DETAILED DESCRIPTION OF THE INVENTION

Figure 1:
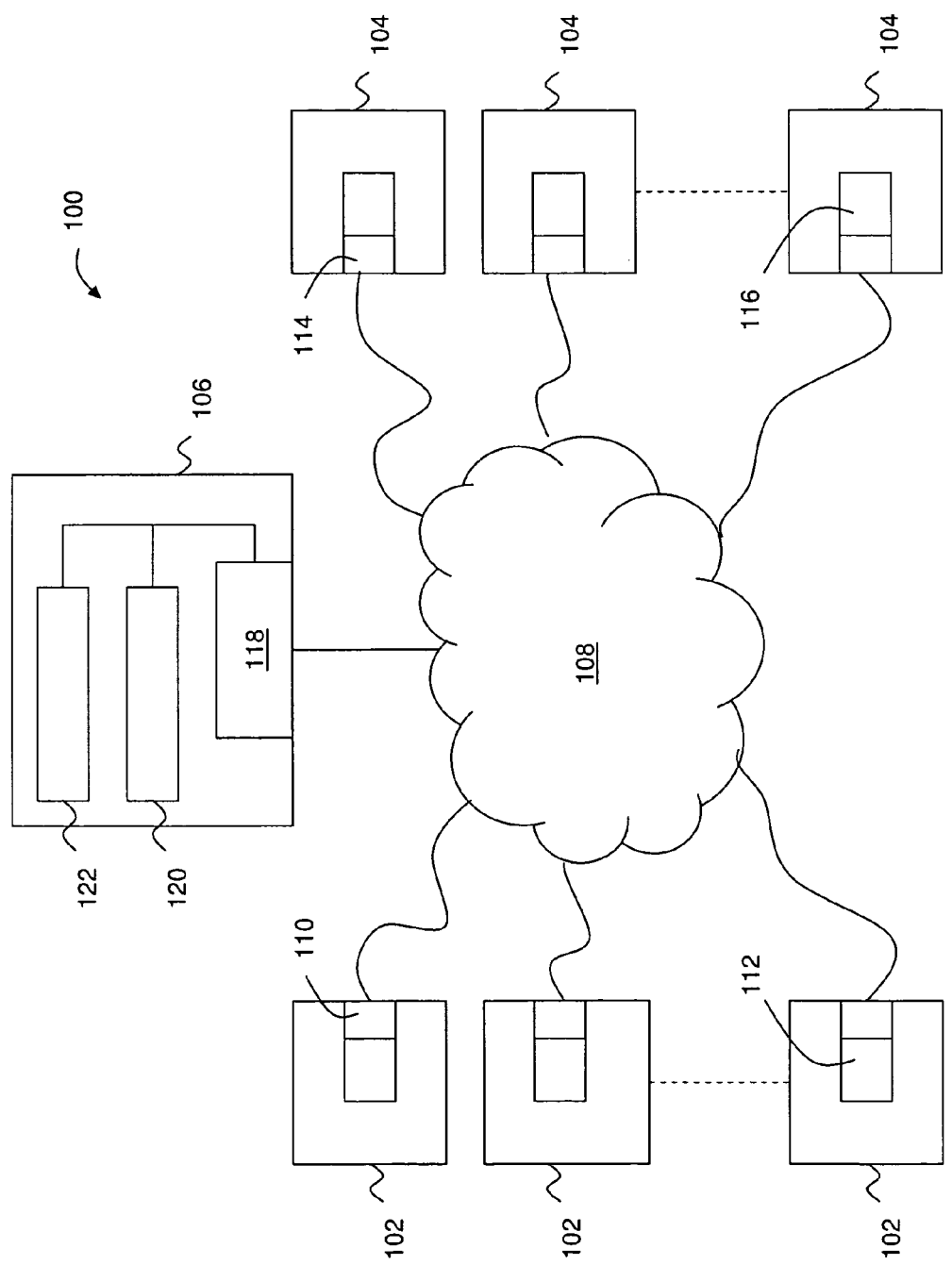
FIG. 1 is a schematic block diagram of an exemplary system for communicating utility data.

In some embodiments, the term "handheld device" refers generally to any portable communication device. Examples of handheld devices include push-to-talk (PTT) radios, mobile computers, and mobile data recording equipment. A PTT radio may be implemented using, for example, a cellular phone, or any other suitable device. In some embodiments described herein, a handheld device may be portable, yet mounted or removably coupled to a predetermined position. Moreover, in some embodiments, the term "utility asset controller" refers generally to a controller or processor that operates a utility asset, including any suitable piece of utility equipment that is capable of transmitting and/or receiving utility data across a utility system network. Furthermore, in some embodiments, the term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the above terms.

A data aggregator, controller, computing device, or computer, such as described herein, includes at least one or more processors or processing units and a system memory. The data aggregator typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

Although described in connection with an exemplary utility data communication system environment, embodiments of the invention are operational with numerous other general purpose or special purpose computing system environments or configurations. The system environment is not intended to suggest any limitation as to the scope of use or functionality of any aspect of the invention. Moreover, the system environment should not be interpreted as having any dependency or requirement relating to any one or combination of components illustrated in the exemplary operating environment. Examples of well known systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more controllers, computers, or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

A technical effect of the methods, systems, and controllers described herein includes at least one of (a) receiving, by a handheld device, an analog voice signal; (b) converting the analog voice signal into a digital voice signal; (c) encrypting the digital voice signal; (d) transmitting the voice signal to a data aggregator via a utility network; (e) encrypting, by a utility asset controller, a data signal; (f) transmitting the data signal to the data aggregator via the utility network; (g) decoding the voice signal and the data signal; (h) combining the voice and data signals to form a communication signal; (i) encrypting the communication signal; (j) transmitting, by the data aggregator, the communication signal to the handheld device and the utility asset controller via the utility network; (k) decoding, by the handheld device and the utility asset controller, the communication signal; (l) filtering the communication signal in order to obtain a voice output data for output by the handheld device; and (m) filtering the communication signal in order to obtain data output for use by the utility asset controller.

FIG. 1 is a schematic block diagram of an exemplary system 100 for communicating utility data. In the exemplary embodiment, system 100 includes a plurality of handheld devices 102, a plurality of utility asset controllers 104, and a data aggregator 106. Moreover, system 100 enables the communication of utility data including, for example, digital voice communications, substation control data, and/or utility meter data. It should be understood by one of ordinary skill in the art that system 100 may also enable communication of any other suitable data for use by utility operators and/or any other consumer of network data.

In the exemplary embodiment, each handheld device 102 enables voice communication, such as voice signals, to be transmitted to a utility network 108 and/or received from utility network 108. More specifically, each handheld device 102 includes a transceiver 110 that is configured to communicate with data aggregator 106 via utility network 108. Transceiver 110 may also communicate with transceiver 110 of another handheld device 102, either with or without the use of utility network 108. In the exemplary embodiment, transceiver 110 is implemented as a wireless transceiver. As such, transceiver 110 may use any suitable wireless communication protocol including, but not limited to including, Code Division Multiple Access (CDMA), cdmaOne, CDMA200, Global System for Mobile telecommunications (GSM), and/or IEEE 802.11, or any combination thereof. In an alternative embodiment, transceiver 110 communicates with data aggregator 106 using a wired connection. In the exemplary embodiment, each handheld device 102 includes a processor 112 that is configured to encrypt the voice signal transmitted by handheld device 102 to data aggregator 106 and/or to another handheld device 102.

In the exemplary embodiment, each utility asset controller 104 enables data communication, such as utility data, to be transmitted to a utility network 108 and/or received from utility network 108. More specifically, each utility asset controller 104 includes a transceiver 114 that is configured to communicate with data aggregator 106 via utility network 108. In the exemplary embodiment, transceiver 114 communicates with data aggregator 106 using a wired connection. In an alternative embodiment, transceiver 114 may be implemented as a wireless transceiver that communicates using a suitable wireless communication protocol. In the exemplary embodiment, each utility asset controller 104 includes a processor 116 that is configured to encrypt the voice signal transmitted by utility asset controller 104 to data aggregator 106.

In the exemplary embodiment, data aggregator 106 is coupled to handheld devices 102 and utility asset controllers 104 via utility network 108. Data aggregator 106 is configured to receive voice signals, such as digital voice signals, from handheld devices 102 using a wireless link and/or a wired connection. Data aggregator 106 is also configured to receive data signals, such as utility data, from utility asset controllers 104 using a wireless link and/or a wired connection. Moreover, data aggregator 106 is configured to combine the received voice and data signals to form a communication signal, and to transmit the communication signal to handheld devices 102 and/or utility asset controllers 104 via utility network 108. As such, data aggregator 106 includes a transceiver 118 that is configured to communicate with handheld devices 102 and utility asset controllers 104 via utility network 108. Moreover, data aggregator 106 includes a processor 120 and a memory 122 coupled to processor 120. Processor 120 is configured to combine the voice and data signals in order to form the communication signal. In some embodiments, processor 120 is configured to decode encrypted voice signals and/or encrypted data signals when received via utility network 108 from handheld devices 102 and/or utility asset controllers 104. Similarly, processor 120 may be configured to encrypt the communication signal prior to transmitting the communication signal to handheld devices 102 and/or utility asset controllers 104 via utility network. Accordingly, in such an embodiment, each handheld device processor 112 and utility asset controller processor 116 is configured to decode the communication signal. In the exemplary embodiment, memory 122 stores, for example, program modules and/or sets computer-executable instructions for decoding encrypted voice and/or data signals, and for encrypting communication signals.

During use, an operator, such as a utility operator or service personnel, speaks into handheld device 102. The voice signal is then transmitted by handheld device 102 to data aggregator 106 via utility network 108 and/or to another handheld device 102. In the exemplary embodiment, the voice signal is transmitted by handheld device transceiver 110 to utility network 108 and/or another handheld device transceiver 110 via a wireless link. Moreover, in one embodiment, the voice signal is a digital voice signal. Furthermore, in one embodiment, handheld device processor 112 encrypts the voice signal before the voice signal is transmitted by handheld device transceiver 110. In the exemplary embodiment, utility asset controller 104 transmits a data signal to data aggregator 106 via utility network 108. More specifically, the data signal is transmitted by utility asset controller transceiver 114 to utility network 108 via a wireless link, a physical connection, or a combination of a wireless link and a physical connection. In one embodiment, the data signal is a digital data signal. Moreover, in one embodiment, utility asset controller processor 116 encrypts the data signal before the data signal is transmitted by utility asset controller transceiver 114.

In the exemplary embodiment, data aggregator 106 receives the voice signal and the data signal via utility network 108. More specifically, data aggregator transceiver 118 receives the voice signal transmitted by handheld device 102, and the data signal transmitted by utility asset controller 104. Data aggregator 106 combines the voice signal and the data signal to form a communication signal. More specifically, data aggregator processor 120 combines the data signal and the voice signal. In one embodiment, the voice signal and/or the data signal are encrypted. In such an embodiment, data aggregator processor 120 decodes the encrypted signals, and then combines the decoded signals in order to form the communication signal.

Moreover, in the exemplary embodiment, data aggregator 106 transmits the communication signal to handheld devices 102 and utility asset controllers 104 via utility network 108. More specifically, data aggregator processor 120 transmits the communication signal to data aggregator transceiver 118, and data aggregator transceiver 118 transmits the communication signal via utility network 108 using a wireless link and/or a physical connection. Each handheld device 102 and utility asset controller 104 receives the communication signal from utility network 108 via handheld device transceiver 110 and utility asset controller transceiver 114, respectively. In one embodiment, data aggregator processor 120 encrypts the communication signal before transmitting the communication signal to data aggregator transceiver 118. In such an embodiment, handheld device transceiver 110 receives the encrypted communication signal and transmits the encrypted communication signal to handheld device processor 112 to be decoded. Similarly, utility asset controller transceiver 114 receives the encrypted communication signal and transmits the encrypted communication signal to utility asset controller processor 116 to be decoded.

Figure 2:
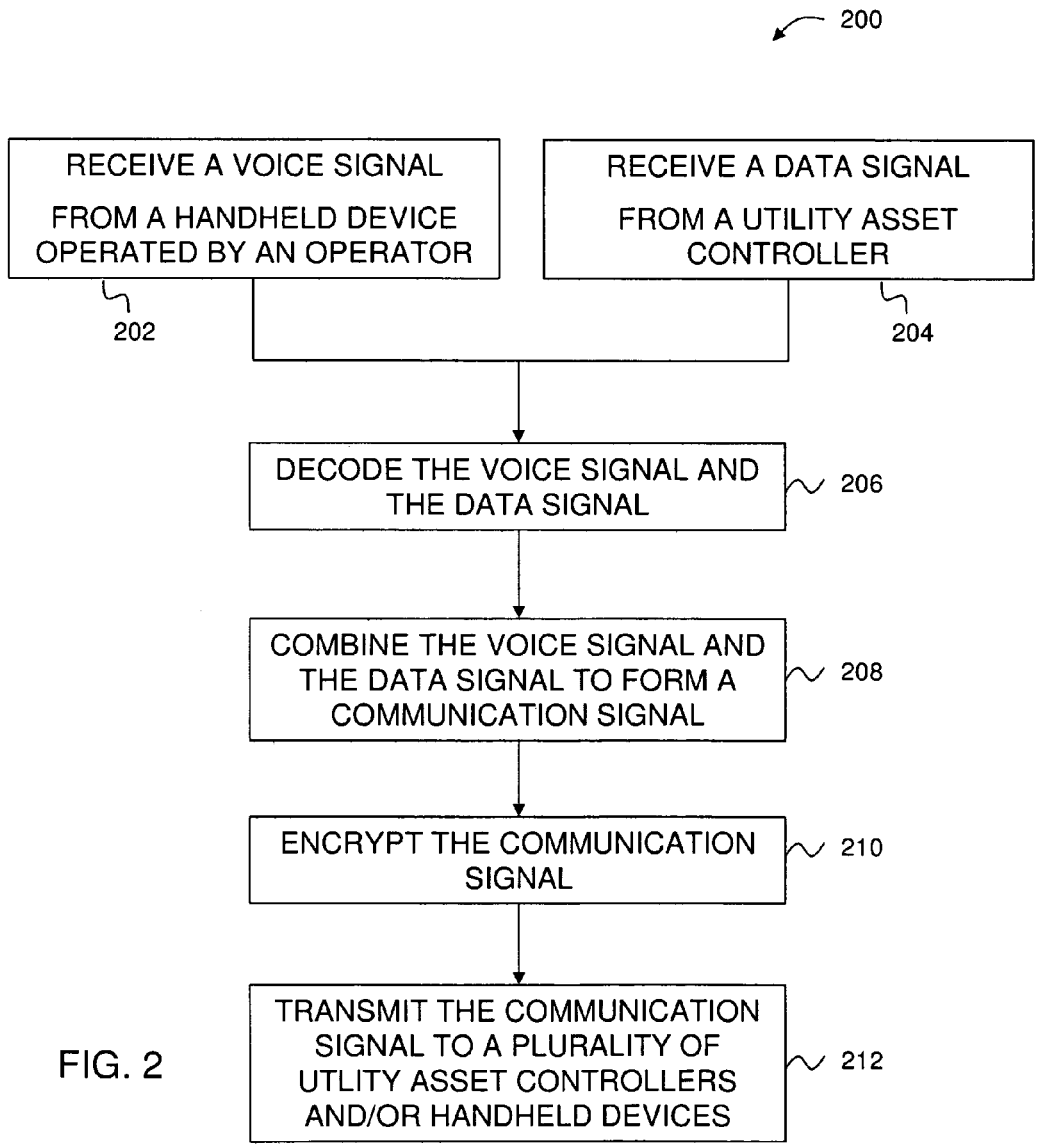
FIG. 2 is a flowchart illustrating an exemplary method of communicating utility data over the utility network shown in FIG. 1.

FIG. 2 is a flowchart 200 illustrating an exemplary method of communicating utility data over a utility network, such as utility network 108 (shown in FIG. 1). In the exemplary embodiment, data aggregator 106 (shown in FIG. 1) receives 202 a voice signal from handheld device (shown in FIG. 1) that is operated by an operator, such as a utility operator. More specifically, handheld device 102 receives an analog voice signal from the operator and converts the analog voice signal to a digital voice signal. In one embodiment, handheld device processor 112 (shown in FIG. 1) encrypts the voice signal. In the exemplary embodiment, handheld device 102 then transmits the voice signal to data aggregator 106 via utility network 108. In one embodiment, handheld device transceiver 110 (shown in FIG. 1) transmits the voice signal to data aggregator transceiver 118 (shown in FIG. 1) via a wireless link. In an alternative embodiment, handheld device transceiver 110 transmits the voice signal to data aggregator transceiver 118 via a physical connection.

Moreover, in the exemplary embodiment, data aggregator 106 receives 204 a data signal from utility asset controller 104 (shown in FIG. 1). More specifically, utility asset controller 104 transmits the data signal to data aggregator 106 via utility network 108. In one embodiment, utility asset controller transceiver 114 (shown in FIG. 1) transmits the data signal to data aggregator transceiver 118 via a wireless link. In an alternative embodiment, utility asset controller transceiver 114 transmits the data signal to data aggregator transceiver 118 via a physical connection. Furthermore, in one embodiment, utility asset controller processor 116 (shown in FIG. 1) encrypts the data signal before the data signal is transmitted to data aggregator 106.

In the exemplary embodiment, each of the voice signal and the data signal are decoded 206 by data aggregator 106. More specifically, data aggregator transceiver 118 receives the voice signal and the data signal, and transmits each signal to data aggregator processor 120 (shown in FIG. 1). Data aggregator processor 120 decodes the encrypted voice and data signals. Moreover, in the exemplary embodiment, data aggregator processor 120 then combines 208 the voice signal and the data signal to form a communication signal. In some embodiments, data aggregator processor 120 encodes 210 the communication signal. The communication signal may be encrypted using the same encryption technique used by handheld device 102 and/or utility asset controller 104. Alternatively, the communication signal may be encrypted using a different encryption technique. However, one of ordinary skill in the art should understand that any suitable encryption technique may be used by data aggregator processor 120.

In the exemplary embodiment, data aggregator 106 transmits 212 the communication signal to each handheld device 102 and/or utility asset controller 104. More specifically, data aggregator processor 120 transmits the communication signal to data aggregator transceiver 118. Data aggregator transceiver 118 then transmits the communication signal to handheld device 102 and utility asset controller 104 via utility network 108. The communication signal is received by handheld device transceiver 110 and utility asset controller receiver 114. Handheld device transceiver 110 transmits the communication signal to handheld device processor 112, which outputs the communication signal to the operator. In one embodiment, because the communication signal includes both voice signal information and data signal information, some of which is not intended for output by handheld device 102, handheld device processor 112 filters the communication signal in order to obtain a voice output signal. In the exemplary embodiment, utility asset controller transceiver 114 transmits the communication signal to utility asset controller processor 116. In one embodiment, because the communication signal includes both voice signal information and data signal information, some of which is not intended for use and/or analysis by utility asset controller 104, utility asset controller processor 116 filters the communication signal in order to obtain a data output signal. In some embodiments in which communication signal has been encrypted, handheld device 102 and utility asset controller 104 decode the communication signal.

Described in detail herein are exemplary embodiments of methods and systems that facilitate enabling utility field personnel to maintain contact with each other and a home office by combining voice and data signals into a signal communication signal that is broadcast to each device and utility asset controller on a utility network. Moreover, encrypting the incoming voice and data signals and/or the outgoing communication signal facilitates securing communications in order to avoid unauthorized monitoring and/or reception of the communications. Furthermore, combining all voice and data communications using a single system enables a utility to avoid a need for parallel systems, thereby reducing system deployment costs and/or system maintenance costs.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assembly packages and methods.

While the invention has been described in terms of various specific embodiments, those skilled in the art will recognize that the invention can be practiced with modification within the spirit and scope of the claims.

What is claimed is:

1. A system for communicating utility data across a utility network, said system comprising:
   a handheld device;
   a utility asset controller; and
   a data aggregator communicatively coupled to said handheld device and said utility asset controller via the utility network, said data aggregator configured to:
      receive a voice signal from said handheld device and a data signal from said utility asset controller;
      combine the voice signal and the data signal to form a utility communication signal;
      encrypt the utility communication signal prior to transmitting the utility communication signal across the utility network; and
      transmit the encrypted utility communication signal across the utility network for reception by at least one of said handheld device and said utility asset controller.

2. A system in accordance with claim 1, wherein the voice signal is a digital voice signal, said handheld device is configured to convert an analog voice signal to the digital voice signal.

3. A system in accordance with claim 1, wherein said data aggregator is configured to receive at least one of the voice signal and the data signal via a wireless link.

4. A system in accordance with claim 1, wherein said data aggregator is configured to receive at least one of the voice signal and the data signal via a physical connection.

5. A system in accordance with claim 1, wherein the voice signal and the data signal are encrypted, said data aggregator configured to decode the encrypted voice signal and the encrypted data signal.

6. A system in accordance with claim 1, wherein the data signal includes at least one of utility substation control data and utility metering data.

7. A system in accordance with claim 1, wherein said data aggregator is configured to transmit the encrypted utility communication signal to the utility network via at least one of a wireless link and a physical connection.

\* \* \* \* \*